Feb. 22, 1966 E. A. WARMAN ETAL 3,237,009
METHOD AND DEVICE FOR RADIOGRAPHY
WITH NEUTRONS OF THERMAL ENERGIES
Filed March 29, 1963 2 Sheets-Sheet 1

INVENTORS
EDWARD A. WARMAN
WILLIAM D. WELTE
BY ALFRED T. GARVEY

Kenyon & Kenyon
ATTORNEYS

INVENTORS
EDWARD A. WARMAN
WILLIAM D. WELTE
BY ALFRED T. GARVEY

Kenyon & Kenyon
ATTORNEYS

United States Patent Office 3,237,009
Patented Feb. 22, 1966

3,237,009
METHOD AND DEVICE FOR RADIOGRAPHY WITH NEUTRONS OF THERMAL ENERGIES
Edward A. Warman and William D. Welte, Gales Ferry, and Alfred T. Garvey, Essex, Conn., assignors to General Dynamics Corporation, New York, N.Y., a corporation of Delaware
Filed Mar. 29, 1963, Ser. No. 269,051
11 Claims. (Cl. 250—83.1)

The invention relates in general to neutron radiography and more praticularly to methods and devices for neutron radiography in which thermal neutron imaging techniques are used.

Neutron radiography is particularly useful in two general classes of situation: first, where the more conventional methods of radiography with gamma or X-rays either cannot be used or can be used only with great difficulty; secondly, where new uses are opened up due to the peculiar nature of the neutron as a particle and its behavioral pattern in transmission through particular materials.

An illustration of the first situation is a case in which the radiography must take place in an environment containing extraneous gamma or X-radiation; another is where the specimen to be examined is itself radioactive.

The attenuation of neutrons while passing through a material is solely a function of the properties of the nuclei. The attenuation of gamma or X-rays, however, is also a function of the number of orbital electrons present in the material and thus is intimately associated with the density of the material.

An illustration of the second situation is therefore a case in which it is desired to examine a combination of two materials which are close in density but have different neutron cross sections, for example, tantalum and tungsten. The term "neutron cross section" is used herein to refer to the probability of interaction between an incoming neutron and the nuclei of a target material, particularly to the probability of absorption and scattering interactions. A second illustration is the radiography of dense materials. Gamma and X-rays are of limited use in the radiography of materials such as bismuth, lead and uranium which have a high mass density, but, since these elements have low mass absorption coefficients for neutrons, neutron radiography is singularly appropriate. Other uses for neutron radiography are enumerated in H. Berger, "A Discussion of Neutron Radiography," XX Nondestructive Testing, pp. 185–94 (1962).

There are two major classes of neutron radiography, each based on the velocity (energy) of the neutrons involved: thermal (low energy) and fast (high energy). Thermal neutron radiography relies upon neutrons having energies ranging from near zero to several electron volts (e.v.); fast neutron radiography upon neutrons having energies of several million electron volts (m.e.v.).

A number of difficulties arise when high energy neutrons are used to radiograph a test specimen. First, since the neutron cross section of a material generally decreases as the energy of the neutrons impinging upon it increases, it is difficult to obtain an inexpensive material which has a sufficiently high cross section for it is to be used as a detector sheet. "Detector sheet" is used herein to refer to a neutron sensitive substance which is located in the path of neutrons which have already passed through the specimen to be radiographed. This sheet is used to detect the effect which the specimen has upon the neutrons. The problem of locating a suitable detector material is further complicated by the fact that as the energy of the neutrons increases, the linearity of variations in the cross section of a given material with respect to variations in the neutron energy generally decreases. Since this is so, if the image detected is to be properly interpreted, the energy of the neutrons must be rather closely controlled and the characteristics of the particular test specimen and detector material known precisely. A third, and for some applications the most significant, difficulty with radiography with fast neutrons is that these neutrons are highly penetrating in nature. Elaborate safety precautions and extensive radiation shielding is thus required when they are used. This not only increases the cost of radiographing a test specimen but also the mass of the apparatus required. As a result there are no known systems of high energy neutron radiography which can properly be said to be capable of portable, field applications.

Turning to systems of radiography which rely upon thermal rather than high energy neutrons, there are three major sources of thermal neutrons which are presently available: (1) nuclear reactors, (2) moderated neutron generators which produce high energy neutrons by, for example, bombarding a target nuclei with ions accelerated in magnetic fields, and which then slow the neutrons down by means of successive scattering collisions in a moderating material, and (3) isotopic sources which use a radioisotope in combination with a radiation-responsive material.

Thermal neutron sources which use a nuclear reactor are too cumbersome and costly for many radiographic applications. This is also true of the presently available, moderated neutron generator sources. In the latter type source, for example, extensive neutron shielding is required due to the high penetrability of the fast neutrons which the source generates.

The third major method of generating thermal neutrons is with an isotopic source. Such sources use a radioisotope which emits alpha or gamma radiation in conjunction with a material which emits neutrons when bombarded by such radiation; for example, beryllium in conjunction with a radioisotope of americium, antimony, californium, plutonium, polonium or radium. No practical system of thermal neutron radiography which uses an isotopic neutron source to obtain a portable, low-cost means of non-destructive radiographic inspection is presently available, however.

The common characteristics of presently available systems of neutron radiography which use the sources set forth above are lack of portability and relatively high cost. A third drawback is that, being massive and cumbersome due to the means employed for generating neutrons and/or the radiation shielding which is required, they are too bulky for use in confined working areas.

It is, therefore, one object of this invention to provide an economical method and device for neutron radiography.

A further object of this invention is to provide a method and device for radiography which uses neutron imaging techniques and an isotopic photoneutron source.

A further object of this invention is to provide a method and device for radiography which is capable of portable use.

A further object of this invention is to provide a method and device for radiography which is capable of use in confined spaces.

A further object of this invention is to provide a method and device for radiography capable of efficient use despite the presence of extraneous gamma or X-radiation.

Other objects and a fuller understanding of this invention may be had by referring to the following descriptions and the accompanying drawings, in which.

Speaking generally, in this invention the emission of neutrons from the interior surface of a receptacle is controlled by inserting a radioisotope into the receptacle when neutron emission is desired, and removing it when it is not. The neutrons thus generated are moderated to thermal energies, collimated and then directed upon the specimen to be radiographed. After their passage through the specimen, the neutrons are detected by a sheet of neutron-sensitive material and their image visually depicted.

Figure 1:
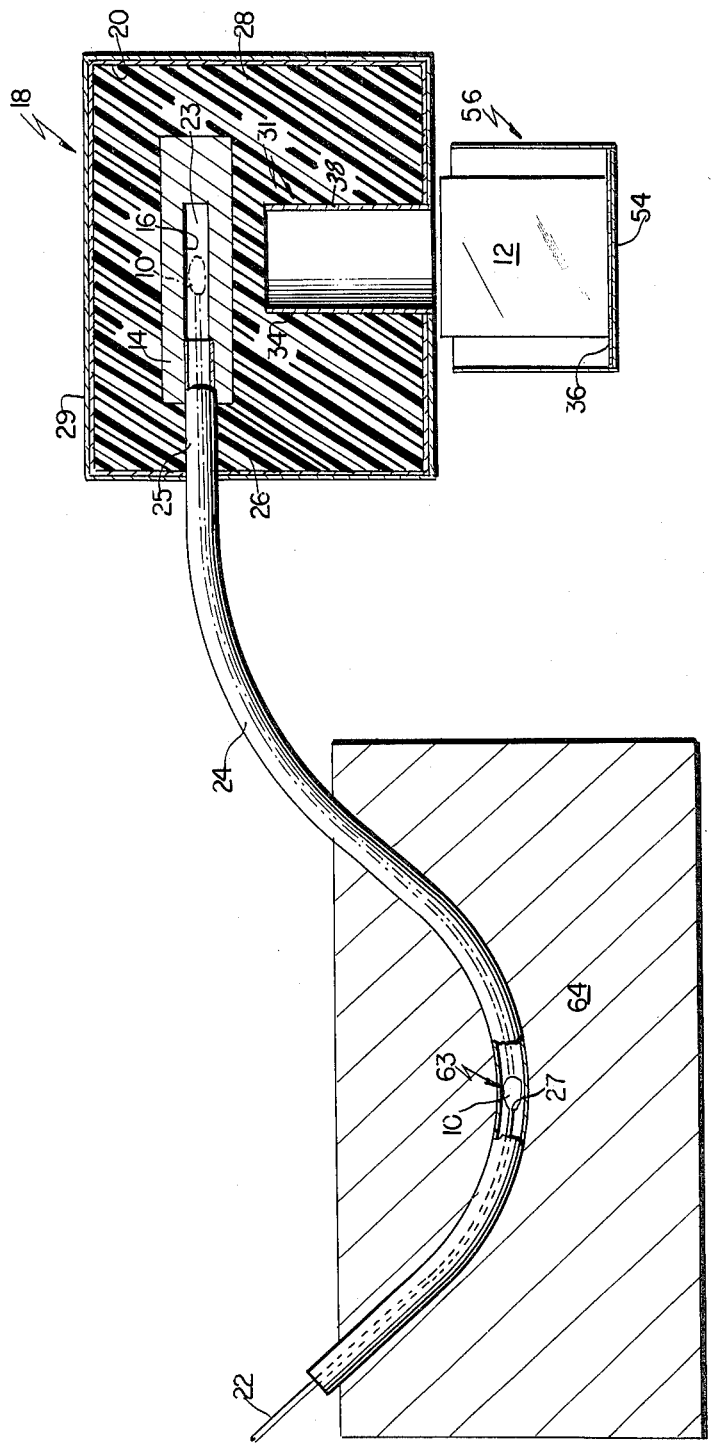
FIG. 1 is a schematic representation of the preferred embodiment of the invention.

Referring now to FIG. 1 in which the preferred embodiment of this invention is set forth, a quantity of antimony–124 is used to provide an isotopic source 10 of gamma-rays. When it is desired to radiograph a specimen 12, these gamma-rays are allowed to impinge upon a neutron source material 14 which will emit neutrons in response to bombardment by gamma-rays. In the preferred embodiment beryllium is used as such a neutron source 14. The beryllium forms the interior surface 16 of a receptacle 18 into which the isotopic source 10 is inserted when it is desired to generate neutrons. It is a feature of this invention that it is only when the isotopic source 10 and the neutron source 14 are disposed proximate to one another that neutrons are generated by the system.

An isotopic source intensity of one hundred curies of antimony–124 has been found satisfactory for many applications. If the neutron mass absorption coefficient of the particular test specimen 12 is high, however, a higher source intensity would be needed. Thus, for example, a source of about five hundred curies would be needed to satisfactorily radiograph a transverse section of a cast iron pipe with an outside diameter of fourteen inches and an inside diameter of twelve and seven-eighths inches. When the dimensions and other characteristics of the various elements of the preferred embodiment are delineated below, it will be assumed that the intensity of the isotopic source 10 is five hundred curies.

The neutron flux obtainable from an antimony-beryllium photoneutron source is almost linearly increased with increasing beryllium thickness. In other words, self-shielding and flux depression losses in the beryllium are not appreciable. The neutron flux desired for a given application would therefore dictate the beryllium thickness to be employed. The space available to position the source, with its moderator and collimator arrangement, would also have a great effect on the selection of configuration and thickness. Typically, one inch of beryllium would be sufficient for many test object radiographs. Two inches of beryllium would provide roughly twice the neutron flux and thereby allow for radiographs of thicker test objects. On the other hand, if it is desired to reduce the exposure time, for a given photoneutron source, the beryllium thickness could be increased. For example, a 500 curie antimony–124 source with one inch of beryllium could be replaced by a 100 curie source with five inches of beryllium. The steel shell 20 is primarily a structural member used to provide a rigid frame for the receptacle 18 and materials other than steel might be used.

A flexible, but relatively incompressible, rod-like member 22, located within a guide tube 24, is used to control the position of the isotopic source 10. The forward end 25 of the guide tube 24 is connected to an aperture 26 in the receptacle 18, and the isotopic source 10 is attached to the forward end 27 of the rod-like member 22.

When it is desired to generate neutrons the rod-like member 22 is advanced into the guide tube 24 a distance sufficient to cause the isotopic source 10 to be inserted into the cavity 23 of the receptacle 18. The gamma-rays emanating from the antimony–124 isotopic source 10 then impinge upon the beryllium neutron source 14 and cause the beryllium to emit neutrons. A safety device may be provided to determine the position of the isotopic source at any position in the guide tube. An example of such a safety device would be pressure microswitches (in circuit with warning lamps) located in the source tip and source container. Movement of the source would activate microswitches and indicate the relative position of the source at any time.

The neutrons emitted from antimony-beryllium sources have been found to have energies ranging up to approximately 25,000 e.v. Since, as discussed earlier, there are several advantages in using thermal neutrons (neutrons with energies ranging from near zero up to two or three electron volts), provision is made for moderating these neutrons to lower energy levels. It should be noted that, when compared with the high energies in fast neutron sources, 25,000 e.v. is already relatively low. Since this is so, less moderation is required than would be needed if the energy level were higher and there will therefore be less loss of neutron flux due to the moderating process. By "neutron flux" is meant the number of neutrons passing through a given area in a given time.

In the preferred embodiment, the beryllium neutron source 14 is surrounded by varying thicknesses of a polyethylene moderator 28, and the receptacle assembly is sheathed with cadmium 29. The cadmium sheath 29 serves to absorb the neutrons which would otherwise leak out of the receptacle 18 and thereby distort the quality of the radiograph. The polyethylene moderator 28 serves at least three purposes: first, it moderates neutrons released by the beryllium neutron source 14 to lower energies prior to their leaving the receptacle 18; secondly, it moderates the neutrons of epicadmium energy released by the beryllium neutron source 14 to lower energies prior to their impinging upon the cadmium sheath 29 (otherwise they would leak through the sheath); thirdly, it saves some of the neutrons which are heading away from the test specimen 12 from loss to the system by scattering them back into the beam of neutrons impinging upon the specimen.

In the preferred embodiment, the cadmium sheath 29 is approximately thirty mils thick, the polyethylene moderator 28 between the beryllium neutron source and the neutron aperture 34 is about seven-eighths of an inch thick, and the polyethylene moderator 28 about the other sides of the beryllium neutron source is about one inch thick. Of course, in any particular case, the optimum amount of cadmium and polyethylene may be determined by varying their dimensions, measuring the neutron flux at the specimen 12 and about the sides of the receptacle 18, and selecting the dimensions which will maximize the former flux, minimize the latter, and yet moderate the neutrons sufficiently so that they are of thermal energy when they impinge upon the specimen 12.

Without moderating material 28 about it, an antimony-beryllium neutron source would be an isotropic (or $4\pi$ solid angle) emitter. With moderating material 28 about it, the geometry of the source would be essentially that of the moderator 28. Since such a neutron distribution is unsuitable for radiographic work, means are provided to collimate the neutrons.

Figure 2:
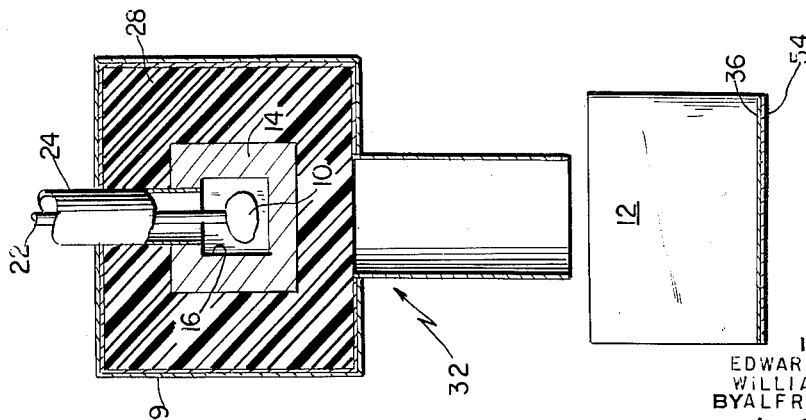
FIG. 2 is a cross-sectional view of a beam-hole collimator.

The collimator 31 in FIG. 1, a beam-hole collimator which is internal to the receptacle, and the collimator 32 in FIG. 2, a beam-hole collimator which is external to the receptacle have several things in common: first, they are both cadmium-lined cylinders; secondly, they are both connected to an aperture 34 in the wall of the receptacle 18; and thirdly, they are both aligned with the specimen under test 12 and the detector sheet 36. Also, by increasing the parallel component in the field of neutrons impinging on the test specimen 12, they both serve to increase the clarity and resolution of the image ultimately depicted of the test specimen 12.

The size of the neutron aperture 34 of the preferred embodiment of the collimator 31 might range from less than one inch to a few inches, depending upon the object being radiographed; the length of the collimator 31 from zero to several inches. In the preferred embodiment a cylinder three inches long having an inside diameter of two inches is used. Although a cadmium lining 38 is shown in the preferred embodiment of FIG. 1, in another embodiment this lining 38 might be omitted. This would have the effect of increasing the neutron flux impinging upon the test specimen 12 but it would also degrade the quality of the neutron image detected by the detector sheet 36 since it would reduce the parallel component of the neutron flux bombarding the test specimen 12.

Figure 4:
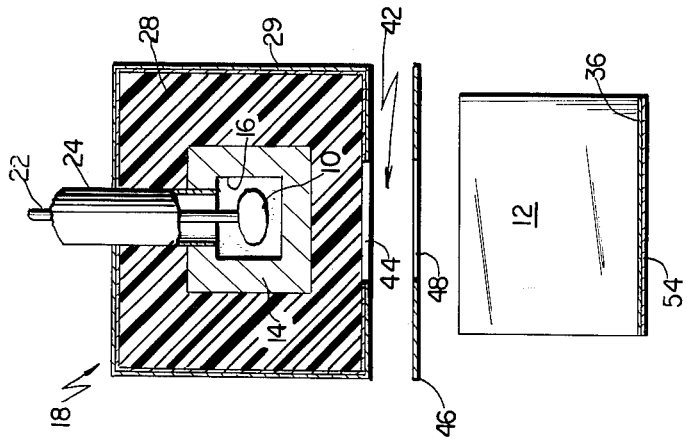
FIG. 4 is a cross-sectional view of a parallel-disk collimator.
Figure 3:
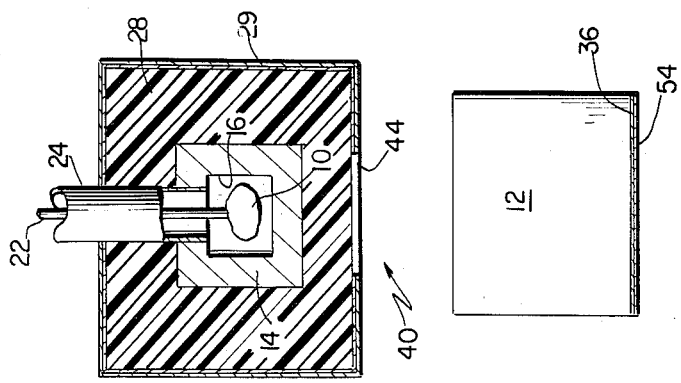
FIG. 3 is a cross-sectional view of a pin-hole collimator.

FIGS. 3 and 4 illustrate two alternative means of collimating the neutrons prior to their impingement upon the test specimen 12. Both of these collimators, the pinhole collimator 40 and the parallel-disk collimator 42, have a neutron source 14, surrounded by varying thicknesses of a moderator 28, and a sheath 29, each element performing functions similar to those performed in the preferred embodiment. Both also have an aperture 44 in the sheath 29 which is aligned with the test specimen 12 and the detector sheet 36. The alternative shown in FIG. 4 has, in addition, however, a collimating sheet 46, which is between the receptacle 18 and the test specimen 12 and has an aperture 48 aligned with that 44 of the sheath. This collimating sheet 46, as well as the sheath 29, might be of cadmium and would help to increase the parallel component in the field of neutrons impinging upon the specimen 12. Of course, several sheets similar to the collimating sheet 46 just described might be interposed between the neutron source 14 and the specimen 12 instead of just one.

Once generated, moderated and collimated, the neutrons are then allowed to impinge upon the specimen 12.

There are two techniques which might be used to depict an image of the neutrons after they have passed through the test specimen: the transfer technique and the direct exposure technique.

In the tranfer technique a detector sheet 36 of material which is responsive to neutron radiation is placed close to the specimen 12, and in the path of neutrons which have passed through the specimen. The image obtained on this sheet is then transferred to a sheet of standard X-ray film by placing the detector sheet 36 and the X-ray film into close proximity. This transfer might be made in a place apart from where the radiographic device is located. If so, at least two advantages would accrue: not only would the radiographic device of this invention be able to operate continuously, but the clarity of the image would be independent of any extraneous gamma or X-radiation extant about the radiographic device.

The transfer technique is the procedure contemplated for use in FIG. 1, in which a detector sheet 36 of a material responsive to neutron radiation is proximate to the test specimen 12 and in the path of neutrons emitted by the beryllium neutron source 14. This detector sheet 36 is indium, and approximately ten mils thick, in the preferred embodiment.

The detector sheet 36 is backed up by a back-scatter sheet 54 which serves to improve the quality of the image portrayed by the detector sheet 36 by preventing neutrons from scattering back onto the detector sheet once they have passed through it. This back-scatter sheet 54 is cadmium, and approximately twenty mils thick, in the preferred embodiment. Similarly, side-scatter sheets 56 might be used about the sides of the detector sheet 36. In the preferred embodiment these side-scatter sheets are of boral (an alloy of boron and aluminum), but other materials, for example, cadmium, might also be used. Finally, in the tranfer technique, the image of the neutron which appears on the detector sheet 36 would be transferred to a sheet of standard X-ray film.

In the second technique which might be used for depiction, i.e. direct exposure, the X-ray film would be coupled with a sheet of a material which is responsive to neutron radiation, and the two exposed simultaneously to the beam of neutrons. Since the X-ray film is sensitive to gamma-radiation the image depicted upon it would be a combined neutron and gamma-ray radiograph. It might therefore be necessary to add further shields about the radiographic device to minimize the gamma-radiation; otherwise the image depicted on the X-ray film might lack adequate definition and clarity. Thus, shielding might be required about the receptacle, with the exception of the beam hole, and/or about the detector sheet and the X-ray film. Such shielding might be of lead, for example.

When it is desired to halt the emission of neutrons, the rod-like member 22 is withdrawn a sufficient distance into the guide tube 24 so that the isotopic source 10 attached to its end 27 leaves the receptacle 18. The position at which the isotopic source 10 is located when neutron emission is not desired is a predetermined location 62 in the guide tube 24 which might be called the "passive" position of the isotopic source.

About this portion 62 of the guide tube 24 there is a shield 64 consisting of a material resistant to the passage of gamma-rays. In the preferred embodiment a lead shield about twenty inches in diameter is used.

A feature of this invention is that as long as the isotopic source 10 is separated from the radiation-responsive material within the receptacle 18 there is no emission of neutrons from the said material 14. For this reason, a relatively small radiation shield 64 will be adequate about the "passive" position of the isotopic source 10. A much more elaborate shield would be required if the isotopic source 10 were to be in permanent proximity to the radiation-responsive material 14 since there would be continuous emission of neutrons and additional gamma-ray sources created due to neutron captures.

In accordance with the spirit of this invention, instead of a flexible, yet relatively incompressible rod-like member, a non-flexible rod or a flexible cable might be used to control the position of the isotopic source. The isotopic source might instead be lowered and raised into position or it might be held stationary and the position of the radiation-responsive means changed. Also, equivalent chemicals might be used to perform the various functions delineated. For example, a radioisotope other than antimony–124 might be used as the isotopic source; a material other than beryllium as the neutron source; paraffin, water or heavy water instead of polyethylene as the moderator; boral instead of cadmium for the sheath, the lining of the collimator and the various scattering shields; dysprosium instead of indium for the detector sheet; and depleted uranium instead of lead for the gamma-radiation shields.

Although this invention has been described with a certain degree of particularity, it is understood that the present disclosure has been made only by way of example and that numerous changes in the details of construction and method of operation and in the combination and arrangement of parts may be resorted to without departing from the spirit and scope of the invention.

What is claimed is:

1. A device for obtaining an inspection radiograph of a specimen by means of neutron radiography comprising: (1) a substance which emits neutrons when gamma rays impinge upon it; (2) a radioactive isotope which emits gamma rays of sufficient energy to cause said substance to emit neutrons; (3) means for bringing said substance and said isotope into proximity suffiicent for gamma rays emitted by said isotope to cause neutrons to be emitted by said substance; (4) moderating means disposed between the specimen and said substance for moderating the neutrons emitted by said substance to thermal energies; (5) collimating means disposed between the specimen and said moderating means for collimating the neutrons emitted by said substance; and (6) means for depicting the effect of the specimen upon neutrons emitted by said substance, the depicting means including radiographic film upon which an inspection radiograph is obtained.

2. A device for obtaining an inspection radiograph of a specimen by means of neutron radiography comprising: (1) a receptacle having an aperture and an interior surface of a material which emits neutrons when gamma rays impinge upon it; (2) a radioactive isotope which emits gamma rays of sufficient energy to cause said material to emit neutrons when said isotope is disposed within said receptacle; (3) means connected to said isotope for moving said isotope into and out of said receptacle; (4) collimating means aligned with and proximate to the aperture for collimating at least a portion of the neutrons emitted by said material; (5) moderating means disposed between said collimating means and said interior surface for moderating the neutrons emitted by said material to thermal energies; and (6) means for depicting the effect of the speciment upon neutrons emitted by said material, the depicting means including radiographic film upon which an inspection radiograph is obtained.

3. A device for obtaining an inspection radiograph of a specimen by means of neutron radiography comprising: (1) a receptacle having an interior surface of a material which emits neutrons when gamma rays impinge upon it, and also having a first and a second aperture; (2) a radioactive isotope which emits gamma rays of sufficient energy to cause said material to emit neutrons when said isotope is disposed within said receptacle; (3) a guide tube having one end disposed proximate to said first aperture; (4) means connected to said isotope for moving said isotope through said guide tube into and out of said receptacle; (5) gamma radiation shielding means disposed about at least a portion of said guide tube; (6) collimating means disposed between the specimen and said second aperture and aligned with and proximate to said second aperture for collimating at least a portion of the neutrons emitted by said material; (7) moderating means disposed between said collimating means and said interior surface for moderating the neutrons emitted by said material to thermal energies; (8) means for depicting the effect of the specimen upon neutrons emitted by said material, the depicting means including radiographic film upon which an inspection radiograph is obtained; and (9) neutron radiation shielding means disposed about at least a portion of the specimen.

4. The device set forth in claim 3 wherein said collimating means is a tubular member connected to said second aperture.

5. The device set forth in claim 3 wherein said collimating means is a tubular member connected to the said second aperture and said tubular member has an interior surface of cadmium.

6. The device set forth in claim 3 wherein said isotope is an isotope of antimony and said material is beryllium.

7. The device set forth in claim 6 wherein said moderating means is polyethylene and said neutron radiation shielding means is cadmium.

8. A device for obtaining an inspection radiograph of a specimen by means of neutron radiography comprising: (1) a receptacle having an interior surface of a material which emits neutrons when gamma rays impinge upon it, and also having a first and a second aperture; (2) a radioactive isotope which emits gamma rays of sufficient energy to cause said material to emit neutrons when said isotope is disposed within said receptacle; (3) a guide tube having one end adjacent to said first aperture; (4) means connected to said isotope for moving said isotope through said guide tube into and out of said receptacle; (5) gamma radiation shielding means disposed about at least a portion of said guide tube; (6) collimating means proximate to said second aperture and extending toward the specimen for collimating at least a portion of the neutrons emitted by said material; (7) moderating means disposed between said collimating means and said interior surface for moderating the neutrons emitted by said material to thermal energies; and (8) means for depicting the effect of the specimen upon neutrons emitted by said material, the depicting means including radiographic film upon which an inspection radiograph is obtained.

9. The method of obtaining an inspection radiograph of a specimen by means of neutron radiography comprising: (1) bringing a substance which emits neutrons when gamma rays impinge upon it and a radioactive isotope which emits gamma rays into sufficient proximity to cause emission of neutrons by said substance; (2) moderating neutrons emitted by said substance to thermal energies prior to their impingement upon the specimen; (3) inducing in a detector sheet a pattern of radioactivity which is a function of the effect which the specimen has upon the neutrons; (4) separating said substance and said isotope when emission of neutrons by said substance is no longer desired; and (5) disposing the detector sheet proximate to radiographic film at a place where there is substantially no gamma radiation, whereby an inspection radiograph of the specimen is obtained on the film.

10. The method of obtaining an inspection radiograph of a specimen by means of neutron radiography comprising: (1) bringing a substance which emits neutrons when gamma rays impinge upon it and a radioactive isotope which emits gamma rays into sufficient proximity to cause emission of neutrons by said substance; (2) moderating neutrons emitted by said substance to thermal energies prior to their impingement upon the specimen; (3) collimating the neutrons emitted by said substance prior to their impingement upon the specimen; (4) inducing in a detector sheet a pattern of radioactivity which is a function of the effect which the specimen has upon the neutrons; (5) separating said substance and said isotope when emission of neutrons by said substance is no longer desired; and (6) disposing the detector sheet proximate to radiographic film at a place where there is substantially no gamma radiation, whereby an inspection radiograph of the specimen is obtained on the film.

11. The method of obtaining an inspection radiograph of a specimen by means of neutron radiography comprising: (1) bringing a substance which emits neutrons when gamma rays impinge upon it and a radioactive isotope which emits gamma rays into sufficient proximity to cause the emission of neutrons by said substance; (2) moderating neutrons emitted by said substance to thermal energies prior to their impingement upon the specimen; (3) collimating the neutrons emitted by said substance prior to their impingement upon the specimen; (4) inducing in a detector sheet a pattern of radioactivity which is a function of the effect which the specimen has upon the neutrons; (5) minimizing the impingement of neutrons for a second time upon said depicting means by shielding said depicting means with a material resistant to the passage of neutrons; (6) separating said substance and said isotope when emission of neutrons by said substance is no longer desired; and (7) disposing the detector sheet proximate to radiographic film at a place where there is substantially no gamma radiation, whereby an inspection radiograph of the specimen is obtained on the film.

References Cited by the Examiner

UNITED STATES PATENTS

| 2,316,595 | 4/1943 | Kallman | 250—65 X |
|---|---|---|---|
| 2,556,768 | 6/1951 | McKibben | 250—83.1 |
| 2,868,990 | 1/1959 | Reardon | 250—106 |
| 2,916,628 | 12/1959 | Prest | 250—106 |
| 2,933,605 | 4/1960 | Ross | 250—83.1 |
| 2,967,937 | 1/1961 | McKay | 250—83.1 |

RALPH G. NILSON, *Primary Examiner.*

JAMES W. LAWRENCE *Examiner.*